T. J. LINDSAY.
TWIN WIRE WHEEL.
APPLICATION FILED NOV. 6, 1916. RENEWED JULY 29, 1919.
1,319,594.
Patented Oct. 21, 1919.
3 SHEETS—SHEET 1.
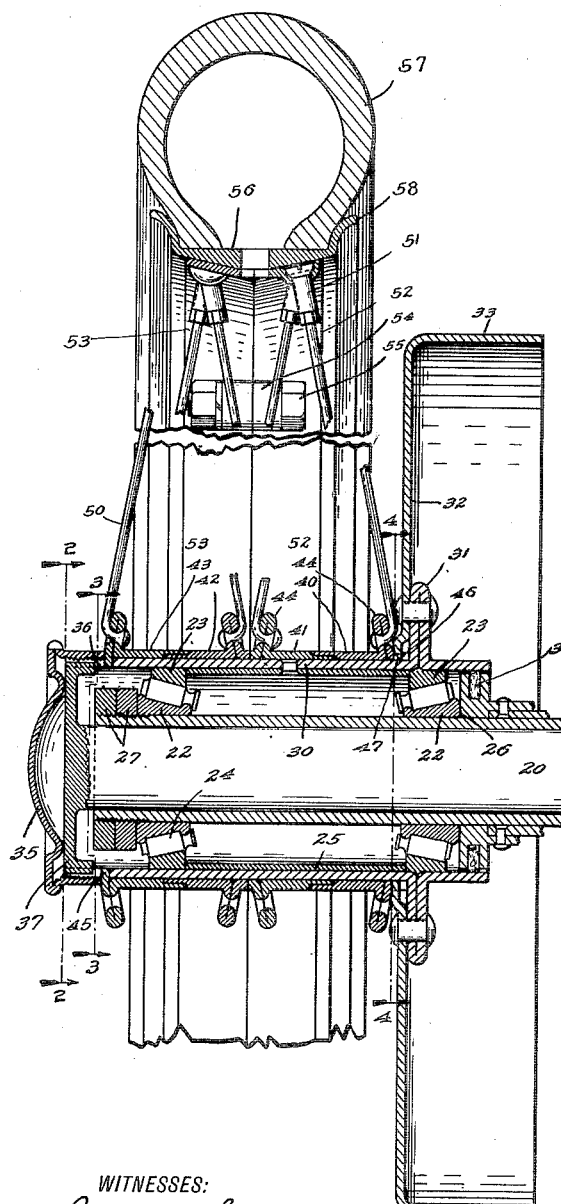
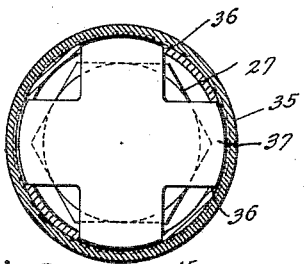
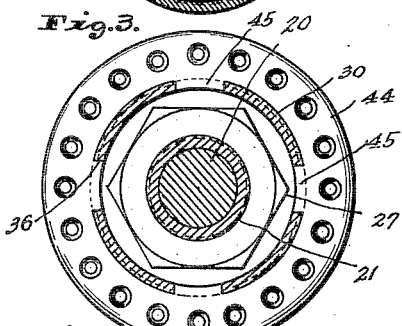
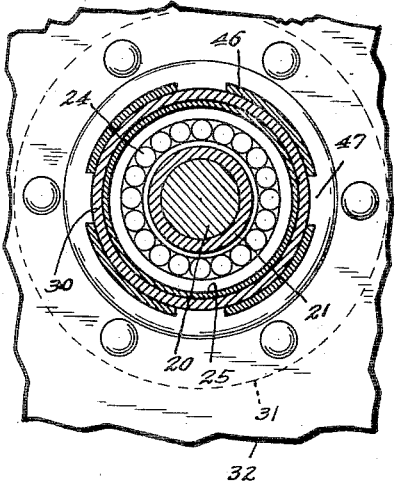
WITNESSES:
INVENTOR
Thomas J. Lindsay,
BY
ATTORNEYS T. J. LINDSAY.
TWIN WIRE WHEEL.
APPLICATION FILED NOV. 6, 1916. RENEWED JULY 29, 1919.
1,319,594.
Patented Oct. 21, 1919.
3 SHEETS—SHEET 2.
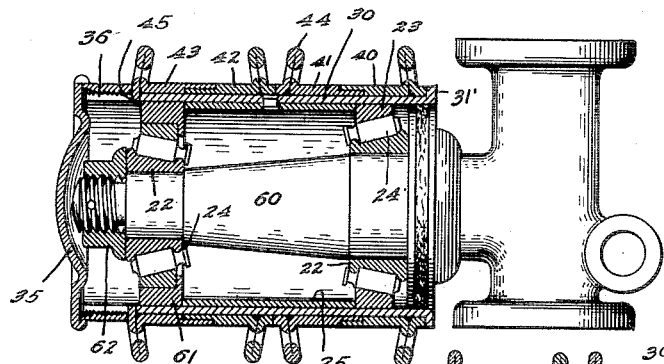
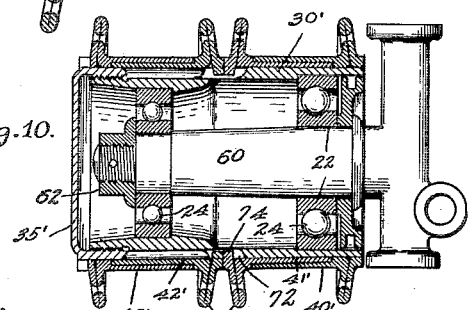
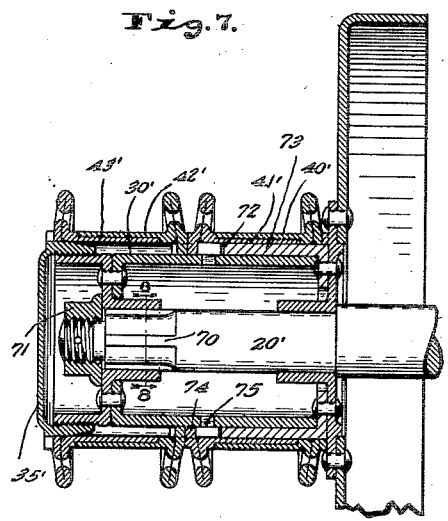
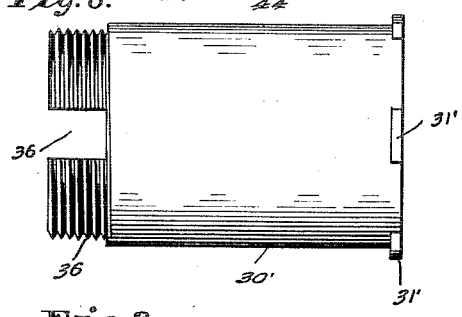
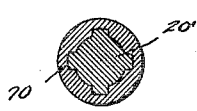
WITNESSES:
Frank A. Fahle
Josephine Gasper
INVENTOR
Thomas J. Lindsay,
BY
Wood & Ashley.
ATTORNEYS

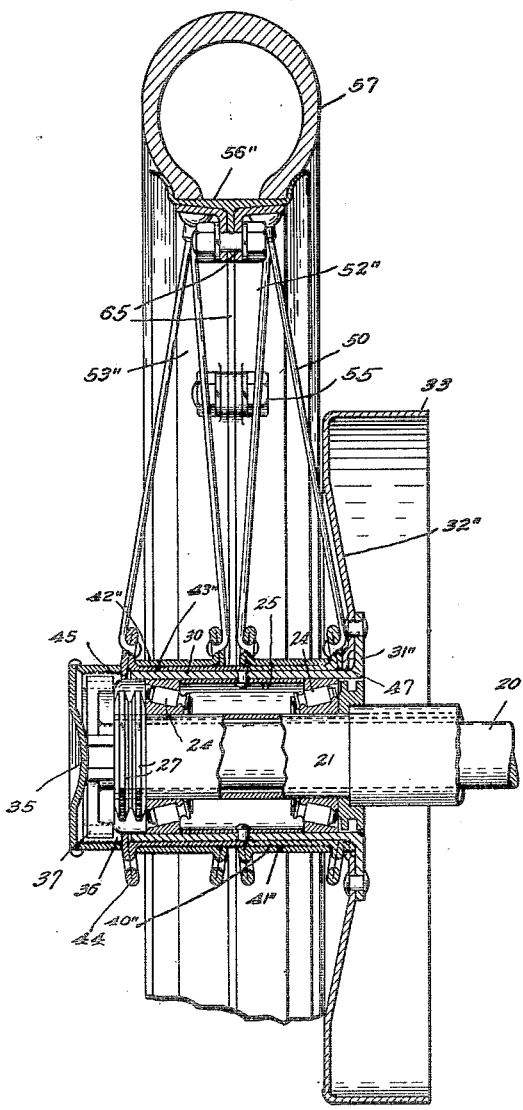

UNITED STATES PATENT OFFICE.

THOMAS J. LINDSAY, OF INDIANAPOLIS, INDIANA, ASSIGNOR TO LINDSAY AUTO PARTS COMPANY, A CORPORATION OF INDIANA.

TWIN WIRE WHEEL.

1,319,594.      Specification of Letters Patent.      Patented Oct. 21, 1919.

Application filed November 6, 1916, Serial No. 129,672. Renewed July 29, 1919. Serial No. 314,164.

*To all whom it may concern:*

Be it known that I, THOMAS J. LINDSAY, a citizen of the United States, residing at Indianapolis, in the county of Marion and State of Indiana, have invented a new and useful Twin Wire Wheel, of which the following is a specification.

It is the object of my invention to produce a twin wire wheel construction which can be readily and conveniently used either as a demountable wheel arrangement, permitting the ready removing and replacing of the wheel as a whole, or as a demountable rim and tire construction, permitting the ready removing and replacing of the rim and tire; which can be applied to either the front steering spindles or the rear driving axle of an automobile, and to the different types of rear driving axles such as the so-called "full-floating" and "semi-floating" types; which rigidly withstands end thrust; which has removable hub parts which interlock with an inner hub part, ordinarily not removed, and with a brake drum when a brake drum is used; which holds the demountable rim and tire rigidly, without the use of the plurality of separated wedging elements ordinarily used in demountable rim constructions; which comprises two complete self-contained wire wheel structures which when put together form the complete wheel and clamp the rim and tire in place, and when separated permit the removal of the rim and tire but themselves remain as complete, self-sustaining, wire wheel structures.

The accompanying drawings illustrate my invention.

Figure 1 is a vertical axial section through a twin wire wheel embodying my invention and associated with a rear axle of the "full-floating" type; Fig. 2 is a section on the line 2—2 of Fig. 1; Fig. 3 is a section on the line 3—3 of Fig. 1; Fig. 4 is a section on the line 4—4 of Fig. 1; Fig. 5 is a view in part similar to Fig. 1, showing the hub members of a wheel embodying my invention, associated with a tapered steering spindle; Fig. 6 is an elevation of the inner hub member of Fig. 5; Fig. 7 is a view somewhat similar to Figs. 1 and 5, showing a modified form of hub construction for a wheel embodying my invention, associated with a driving axle of the "semi-floating" type; Fig. 8 is a section on the line 8—8 of Fig. 7; Fig. 9 is a view similar to Fig. 1, showing a slightly modified construction, especially in the outer hub members, the relative arrangement of brake drum and spokes, and the arrangement for clamping the tire-rim in place on the wheel; and Fig. 10 is a view somewhat similar to Fig. 5, showing the association with a steering spindle of the hub members which in Fig. 7 are shown associated with the driving axle of the semi-floating type.

In the arrangement shown, in Fig. 1, the driving shaft 20 of the rear axle of the full-floating type is mounted within the axle casing 21, and this axle casing carries two separated roller bearing races 22 between which and the roller bearing cups 23 are mounted the tapered roller bearings 24. The two cups 23 are separated by a tubular spacer 25, conveniently made of sheet metal tubing, and one of the races 22 bears against a suitable shoulder 26 on the axle casing 21 while the other or outer race is acted on by a pair of nuts 27 threaded on the end of the casing 21, so that by tightening these nuts both roller bearings are tightened, the force being transmitted from one bearing to the other through the tubular spacing member 25.

Mounted on the tubular spacing member 25 and ball races 23, and riveted to such spacing member, is the inner and normally nonremovable hub member 30, which is made of a sheet metal stamping or of sheet metal tubing and at or near its inner end is provided with an outwardly projecting flange 31 to which is riveted the supporting web 32 of the brake drum 33, also formed of a sheet metal stamping. The axle casing 21 carries a dust guard 34 which fits within the inner end of the inner hub member 30, and the outer end of such inner hub is threaded externally to receive a removable dust cap 35. At its outer threaded end, the inner hub 30 is also provided with a plurality of notches 36, for receiving the ends of outwardly extending fingers 37 on the outer end of the driving shaft 20 of the rear axle, so that the motion of such driving shaft is transmitted to the inner hub member 30.

Mounted on the inner hub 30 are the outer or removable hubs. There are two of these, each comprising two telescoping parts. The hub toward the brake drum comprises the two sheet metal parts 40 and 41, which meet and overlap at their adjacent ends to form a telescoping joint. The hub remote from the brake drum comprises the two sheet metal parts 42 and 43, which also meet and overlap at their adjacent ends to form a telescoping joint. Each of these parts is made of a sheet metal stamping and is provided near one end with an outwardly extending spoke-attaching flange 44, formed by two thicknesses of the sheet metal as indicated. The outer lap of the flange 44 on the hub member 43 extends inward at certain points to form teeth 45, which project inward into the notches 36 in the end of the inner hub 30 so as to interlock this inner hub with the outer hub member 43. The outer hub member 40 is provided with an axial extension 46 beyond its flange 44, which extension 46 is notched to receive radially inwardly projecting teeth 47 from the web 32 of the brake drum 33, so as to interlock the hub member 40 with the brake drum and therefore with the inner hub 30. The dust cap 35 holds the outer hub members 40, 41, 42, and 43 in proper relationship on the inner hub 30, with the outer hub members 41 and 42 abutting, the outer hub members 40 and 43 respectively overlapping upon the outer hub members 41 and 42, and the outer hub members 40 and 43 in proper interlocking relationship with the brake drum and the inner hub member, so that the hub rotates as a unit. By removing the dust cap 35, it becomes possible to remove either the outer hub 42—43 separately, or the two outer hubs 42—43 and 40—41 together.

The flanges 44 receive the inner ends of wire spokes 50. The outer ends of these spokes are fastened in nipples 51 on two wheel-rims 52 and 53, which may be made of sheet metal punchings if desired, the spokes from the outer hub sections 40 and 41 leading at opposite inclinations to the wheel rim 52, and those from the outer hub members 42 and 43 leading at opposite inclinations to the wheel rim 53. Thus each wheel section, comprising a wheel rim, a pair of hub sections, and interconnecting spokes, is self-contained, the tension of the oppositely inclined spokes of such wheel section holding in firm engagement the telescopic joint between the two hub members thereof. It is these wheel sections which may be removed as units, or replaced as units, upon the removal of the dust cap 35. The angles of the different sets of spokes to the plane of the wheel are not necessarily the same, but preferably the spokes from the hub sections 41 and 42 are at equal and opposite angles to such plane, and the spokes from the hub sections 40 and 43 are likewise at equal and opposite angles to such plane, though these angles for the spokes from the latter two hub sections are not the same as those of the spokes from the former two in the arrangement shown in Fig. 1. The wheel rims 52 and 53 at their adjacent edges are provided with inwardly projecting lugs 54, for receiving bolts 55 by which the two wheel sections may be clamped firmly together to form a unit wheel, which may be thus removed as a unit upon the removal of the dust cap 35.

The outer surfaces of the wheel rims 52 and 53 are oppositely conical, and of smaller diameter at their adjacent edges, and coöperate with inner and oppositely conical surfaces on a tire-rim 56, which carries any suitable tire, such as a pneumatic tire 57. As shown, the tire-rim 56 has outwardly projecting flanges 58 at its outer edges, to hold the pneumatic tire 57 in place, in the usual manner. The inner conical surfaces on the tire-rim 56 coöperate with the outer conical surfaces on the wheel-rims 52 and 53 to clamp the tire-rim to the wheel-rims when the bolts 55 are tightened.

This structure produces at once a demountable rim arrangement and a demountable wheel arrangement. By leaving the bolts 55 in place, the removal of the dust cap 35 makes it possible to remove the complete wheel as a unit, all the outer hub parts 40, 41, 42, and 43 sliding off the inner hub 30. This is the demountable wheel. By removing the bolts 55, the removal of the dust cap 35 makes it possible to remove one wheel section, comprising the outer hub 42—43 and the wheel-rim 53, leaving in place on the inner hub 30 the other wheel section comprising the outer hub 40—41 and the wheel rim 52. The separation of the wheel-rims 52 and 53 releases the tire-rim 56, which may now be removed, with its tie 57, to permit repairs or the substitution of another similar tire-rim and tire. The wheel section 42—43—53 may now be replaced and the replaced or substituted tire rim clamped in place by the bolts 55. The replacement of the dust cap 35 now locks the complete wheel in place on the inner hub 30.

Substantially the same wheel structure as shown in Fig. 1 in connection with a driving axle of the "full-floating" type is shown in Fig. 5 in connection with a tapered steering spindle. The outer hub members 40, 41, 42, and 43, with their flanges 44 for the attachment of the spokes leading to the two rims are identically the same. These are mounted in place on the inner hub member 30 identical with that shown in Fig. 1 save that the flange 31' does not carry a brake drum and is made of but a single thickness of metal, instead of being lapped upon itself as shown in Fig. 1. This inner hub 30 is provided with the same notches 36 at its outer end, for receiving the inwardly projecting teeth 45 from the outer hub member 43, and the dust cap 35 locks the outer hub members in proper position on the inner hub 30 and against the flange 31'. However, this structure is mounted on the tapered spindle 60, which carries the races 22 for the bearings 24, the cups 23 for such bearings being separated by the inner tubular spacer 25 riveted to the inner hub member 30. However, since the spindle 60 is tapered, one bearing is smaller than the other, so that the flanged annulus 61 is used around the cup 23 of the smaller bearing to transmit the force from such cup to the spacer 25. The bearings are clamped in place on the spindle by the nut 62 on the end of the latter. This structure may be demounted either as the complete wheel or as the tire and rim, in the same manner as already described in connection with the arrangement shown in Fig. 1.

A modification of the structure shown in Fig. 1 is shown in Fig. 9. In this latter arrangement, which is shown as applied to a "full-floating" rear axle, there are the same driving shaft 20, casing 21, roller bearings 24 with their races and cups, spacer 25, and clamping nuts 27. The inner hub 30 is riveted as before to the spacer 25, but in this case is provided at its inner end with a flange 31'' of a single thickness of metal, thus corresponding to the arrangement shown in Fig. 5 more closely than to that shown in Fig. 1. The web 32'' of the brake drum 33 is riveted to this flange 31'', and has inwardly projecting teeth 47 for meshing with the outer or removable hub member at the inner axial end of the wheel, exactly as in Fig. 1. The inner hub member 30 at its outer end is upset to provide a portion of increased thickness, in which thicker portion the notches 36 are provided as before for interlocking with the outwardly projecting fingers 37 on the shaft 20 and the inwardly projecting fingers 45 on the outer hub member at the outer axial end of the wheel. This thicker end portion of the inner hub is externally threaded as before to receive the dust cap 35, which clamps the removable hub members in place as before.

These removable hub members are slightly different from those previously described. The intermediate outer hub members 41'' and 42'' form telescopic joints with the end outer hub members 40'' and 43'', but this telescoping joint instead of being made by rabbeting as in the arrangement shown in Figs. 1 and 5 is made of metal of uniform thickness, and the ends of the barrels of the ends of the members 41'' and 42'' abut against the flanges 44 of the end outer hub members 40'' and 43''. By this arrangement, whereby it is possible to use metal of uniform thickness for these outer hub members, the cost is reduced by reason of the elimination of the machine work required in the joint shown in Figs. 1 and 5. Moreover, the barrel of one end outer hub member, here that of the member 43'', projects under the associated intermediate outer hub member 42'' and partly under the other intermediate outer hub member 41'', and under this last outer hub member abuts against the end of the barrel of the other end outer hub member 40''. This produces not only a telescopic joint between the hub members of each of the two wheel sections, but a telescopic joint between the two wheel sections themselves. Both the inner hub member and all the outer hub members in the arrangement shown in Fig. 9 are made of steel tubing, by simple stamping operations and without machining save for the screw-threading for the dust cap 35.

The flanges 44 of the various outer hub sections in the arrangement shown in Fig. 9 are connected as before by spokes 50 to nipples on two wheel-rim sections 52'' and 53'', which preferably have conical outer surfaces between which is clamped the tire-rim 56'' carrying the tire 57. The outer rim 56'' has inwardly projecting lugs 65 at its axial middle, which lugs 65 register with the inwardly projecting lugs 54 on the wheel-rim sections so that the bolts 55 clamp the lugs 65 between the lugs 54. The bolts 55 and the complemental conical surfaces on the wheel rim sections and the tire rim produce a double clamping action upon the tire rim. If desired, these complemental surfaces may be made cylindrical.

The spokes 50 at the inner axial end of the wheel project under the brake drum 33, the web 32'' of such brake drum being dished to permit this. This facilitates the replacement of structures now in use by the twin wire wheel structure shown in Fig. 9.

In Figs. 7 and 10 I have shown another modification, in which a twin wire wheel embodying my invention is shown applied to a semi-floating rear axle and to a front steering spindle respectively. Here the inner or non-removable hub 30' is either attached to the end of the driving shaft 20' of the semi-floating rear axle, as by interfitting castellations 70, and a clamping nut 71, or mounted on ball bearings on the tapered steering spindle 60, in the latter case being provided with suitable shoulders for bearing against the adjacent faces of the ball cups, in the same way as the shoulders formed by the ends of the spacer 25 do in the arrangements previously described. This hub member 30' is of greater diameter at its inner end than at its outer end, either by being formed of two telescoping parts as in Fig. 7 or by being formed of one piece as in Fig. 10. In either case, the smaller or outer end of the non-removable inner hub is screw-threaded externally to receive a dust cap 35', the exterior of which is of substantially the same size as is the larger end of such inner hub. At the intermediate point of the hub 30' where it changes in diameter, it is provided with a plurality of axially extending slots 72 in the end of the portion of larger diameter, which slots are provided in the outer telescoping part 73 of the hub 30' in the arrangement shown in Fig. 7. Inwardly projecting teeth 74 on the intermediate outer hub members 41' and 42' project into these notches 72, such teeth being provided by the inward continuation of one of the laps of the spoke flanges 44 of such outer hub members. This interengagement locks the outer hubs to the inner hub. The end outer hub members 40' and 43' telescope with the intermediate outer hub members 41' and 42', for substantially the full lengths of the barrels thereof, and at their flanged ends rest on the larger end of the inner hub and on the outer surface of the dust cap respectively. The notches 72 in the outer portion 73 of the inner hub 30' in the arrangement shown in Fig. 7 also receive the heads of screws 75 projecting outward from the main portion of such inner hub, so as to lock the two portions together and transfer the power from the shaft 20' through the inner hub 30' and teeth 74 to the outer hubs.

In all these arrangements, the wheel structure may be demounted as a unit, by removing the dust cap; and may also provide a demountable rim and tire structure, by removing the bolts 55 to disconnect the two wheel sections, thus permitting the removal of the outer wheel section when the dust cap is removed so that the tire rim and tire are released and may be removed without requiring the removal of the inner wheel section. In all these structures each wheel section is self-contained, itself comprising a complete wire wheel. Preferably, a balanced action of the spokes in the two wheel sections is obtained, the two outer sets of spokes being at equal and opposite angles, and the two inner sets of spokes also being at equal and opposite angles, to the plane of the wheel. In any of these structures the two intermediate outer wheel hubs with their spokes may be made interchangeable; this is illustrated in the arrangements of Figs. 1, 5, 9, and 10, though it is not the case in the arrangement illustrated in Fig. 7. In all the structures illustrated, the same wheel may be used on the rear driving axle of the front steering spindle; thus the wheels shown in Figs. 1 and 9 as applied to driving axles may be used on the steering spindle of Fig. 5, and the wheel shown in Fig. 7 as applied to a driving axle may be used on the steering spindle of Fig. 10. The hub parts may all be made of steel tubing, with little or no machining, as may also the wheel rims.

I claim as my invention:

1. In a wheel structure, the combination of an inner tubular hub having an outwardly projecting flange at one end, a brake drum having a web attached to said outwardly projecting flange, said web having inwardly projecting teeth, and a wheel having a tubular hub telescoping upon said inner hub and notched at one end to interlock with said inwardly projecting teeth.

2. In a wheel structure, the combination of an inner tubular hub notched at one end and having an outwardly projecting flange at the other, a brake drum having a web attached to said outwardly projecting flange, said web having inwardly projecting teeth, and a wheel having a tubular hub telescoping upon said inner hub and notched at one end to interlock with said inwardly projecting teeth and itself provided with inwardly projecting teeth at the other end to project into the notches in the end of said inner hub.

3. In a wheel structure, the combination of an inner tubular hub having an outwardly projecting flange at one end, a brake drum having a web attached to said outwardly projecting flange, said web having inwardly projecting teeth, a wheel having a tubular hub telescoping upon said inner hub and notched at one end to interlock with said inwardly projecting teeth, and a member screw-threaded on the other end of said inner hub from that which is flanged for clamping the hub of said wheel in place thereon with the teeth and notches interlocking.

4. In a wheel structure, the combination of an inner tubular hub notched at one end and having an outwardly projecting flange at the other, a brake drum having a web attached to said outwardly projecting flange, said web having inwardly projecting teeth, a wheel having a tubular hub telescoping upon said inner hub and notched at one end to interlock with said inwardly projecting teeth and itself provided with inwardly projecting teeth at the other end to project into the notches in the end of said inner hub, and a member screw-threaded on the other end of said inner hub from that which is flanged for clamping the hub of said wheel in place thereon with the teeth and notches interlocking.

5. In a wheel structure, the combination of an inner tubular hub notched at one end and having an outwardly projecting flange at the other, a brake drum having a web attached to said outwardly projecting flange, said web having inwardly projecting teeth, and a wheel composed of two axial sections clamping an outer rim and tire between them, each of said sections having a tubuuar hub telescoping upon said inner hub, the hub of one of said sections being notched at one end to interlock with said inwardly projecting teeth and the hub of the other section being itself provided with inwardly projecting teeth to project into the notches in the end of said inner hub.

6. In a wheel structure, the combination of an inner tubular hub notched at one end and having an outwardly projecting flange at the other, a brake drum having a web attached to said outwardly projecting flange, said web having inwardly projecting teeth, a wheel composed of two axial sections clamping an outer rim and tire between them, each of said sections having a tubular hub telescoping upon said inner hub, the hub of one of said sections being notched at one end to interlock with said inwardly projecting teeth and the hub of the other section being itself provided with inwardly projecting teeth to project into the notches in the end of said inner hub, and a member screw-threaded on the notched end of said inner hub for clamping the hubs of said two wheel sections in place thereon with the teeth and notches interlocking.

7. In a wheel structure, the combination of an inner tubular hub having an outwardly projecting flange at one end, a brake drum having a web attached to said outwardly projecting flange, said web having inwardly projecting teeth, and a wheel having a tubular hub telescoping upon said inner hub and notched at one end to interlock with said inwardly projecting teeth, said wheel also having a rim and wire spokes connecting the rim to said second tubular hub, said second hub comprising a plurality of sheet metal stampings telescoping on one another and provided with outwardly projecting flanges for the attachment of wire spokes.

8. In a wheel structure, the combination of an inner tubular hub notched at one end and having an outwardly projecting flange at the other, a brake drum having a web attached to said outwardly projecting flange, said web having inwardly projecting teeth, and a wheel having a tubular hub telescoping upon said inner hub and notched at one end to interlock with said inwardly projecting teeth and itself provided with inwardly projecting teeth at the other end to project into the notches in the end of said inner hub, said wheel also having a rim and wire spokes connecting the rim to said second tubular hub, said second hub comprising a plurality of sheet metal stampings telescoping on one another and provided with outwardly projecting flanges for the attachment of wire spokes.

9. In a wheel structure, the combination of an inner tubular hub notched at one end and having an outwardly projecting flange at the other, a brake drum having a web attached to said outwardly projecting flange, said web having inwardly projecting teeth, and a wheel having a tubular hub telescoping upon said inner hub and notched at one end to interlock with said inwardly projecting teeth and itself provided with inwardly projecting teeth at the other end to project into the notches in the end of said inner hub, said wheel also having a rim and wire spokes connecting the rim to said second tubular hub, said second hub comprising a plurality of sheet metal stampings telescoping on one another and provided with outwardly projecting flanges for the attachment of wire spokes, each of said flanges consisting of two laps of sheet metal and said second set of inwardly projecting teeth being formed of an inward continuation of one of such laps of one of the flanges.

10. In a wheel structure, the combination of an inner tubular hub notched at one end and having an outwardly projecting flange at the other, a brake drum having a web attached to said outwardly projecting flange, said web having inwardly projecting teeth, and a wheel composed of two axial sections clamping an outer rim and tire between them, each of said sections having a tubular hub telescoping upon said inner hub, the hub of one of said sections being notched at one end to interlock with said inwardly projecting teeth and the hub of the other section being itself provided with inwardly projecting teeth to project into the notches in the end of said inner hub, the inner hub and the outer hubs all being formed of sheet metal stampings.

11. In a wheel structure, the combination of an inner tubular hub having an outwardly projecting flange at one end and notched at the other end, two outer hubs mounted in axial alinement on said inner hub, each of said outer hubs comprising two tubular members telescoping on each other and each of such members being provided with an outwardly extending flange, the two intermediate outer hub members being mounted on the outside of the end outer hub members, and one of the end outer hub members projecting entirely under the intermediate outer hub member which with it forms one of the outer hubs and part way under the intermediate outer hub member which forms part of the other outer hub, one of the end outer hub members abutting against said flange and the other having inwardly projecting teeth extending into said notches, two wheel-rims, and wire spokes connecting said wheel-rims to the flanges of the respective hubs.

12. In a wheel structure, the combination of an inner tubular hub, two outer hubs mounted in axial alinement on said inner hub, each of said outer hubs comprising two tubular members telescoping on each other and each of such members being provided with an outwardly extending flange, the two intermediate outer hub members being mounted on the outside of the end outer hub members, and one of the end outer hub members projecting entirely under the intermediate outer hub member which with it forms one of the outer hubs and part way under the intermediate outer hub member which forms part of the other outer hub, two wheel-rims, and wire spokes connecting said wheel-rims to the flanges of the respective hubs.

13. In a wheel structure, the combination of an inner tubular hub having an outwardly projecting flange at one end and notched at the other end, two outer hubs mounted in axial alinement on said inner hub, each of said outer hubs comprising two tubular members telescoping on each other and each of such members being provided with an outwardly extending flange, the two intermediate outer hub members being mounted on the outside of the end outer hub members, and one of the end outer hub members projecting entirely under the intermediate outer hub member which with it forms one of the outer hubs and part way under the intermediate outer hub member which forms part of the other outer hub, one of the end outer hub members abutting against said flange and the other having inwardly projecting teeth extending into said notches, two wheel-rims, and wire spokes connecting said wheel-rims to the flanges of the respective hubs, said inner hub and all said outer hub members being formed of sheet metal stampings.

14. In a wheel structure, the combination of an inner tubular hub, two outer hubs mounted in axial alinement on said inner hub, each of said outer hubs comprising two tubular members telescoping on each other and each of such members being provided with an outwardly extending flange, the two intermediate outer hub members being mounted on the outside of the end outer hub members, and one of the end outer hub members projecting entirely under the intermediate outer hub member which with it forms one of the outer hubs and part way under the intermediate outer hub member which forms part of the other outer hub, two wheel-rims, and wire spokes connecting said wheel-rims to the flanges of the respective hubs, said inner hub and all said outer hub members being formed of sheet metal stampings.

15. In a wheel structure, the combination of an inner tubular hub, two outer hubs mounted in axial alinement on said inner hub, each of said outer hubs comprising two tubular members telescoping on each other and each of such members being provided with an outwardly extending flange, the two intermediate outer hub members being mounted on the outside of the end outer hub members, and one of the end outer hub members projecting entirely under the intermediate outer hub member which with it forms one of the outer hubs and part way under the intermediate outer hub member which forms part of the other outer hub, two wheel-rims, and wire spokes connecting said wheel-rims to the flanges of the respective hubs, said inner hub and all said outer hub members being formed of sheet metal stampings, said inwardly projecting teeth being formed by a continuation of a second lap on the flange of said end outer hub member.

16. In a wheel structure, the combination of an inner tubular hub, and two outer hubs mounted in axial alinement on said inner hub, each of said outer hubs comprising two tubular members telescoping on each other and each of such members being provided with an outwardly extending flange, said two intermediate outer hub members being interchangeable.

17. In a wheel structure, the combination of an inner tubular hub, and two outer hubs mounted in axial alinement on said inner hub, each of said outer hubs comprising two tubular members telescoping on each other and each of such members being provided with an outwardly extending flange, said inner hub and all said outer hub members being formed of sheet metal stampings.

18. In a wheel structure, the combination of an inner hub, two complete wheel sections removably mounted thereon in axial alinement and each comprising a hub, a wheel-rim, and wire spokes interconnecting said hub and wheel-rim at opposite inclinations, a tire-rim mounted on said wheel sections and having projections extending radially inward between the wheel-rims of such wheel sections, and means projecting through said projections and the wheel rims of said wheel sections for fastening the same together.

19. In a wheel structure, the combination of an inner hub, two complete wheel sections removably mounted thereon in axial alinement, a tire-rim mounted on said wheel sections and having projections extending radially inward between such wheel sections, and means projecting through said projections and said wheel sections for fastening the same together.

20. In a wheel structure, the combination of an inner hub, two complete wheel sections removably mounted thereon in axial alinement and each comprising a hub, a wheel-rim and wire spokes interconnecting said hub and wheel-rim at opposite inclinations, a tire-rim mounted on said wheel sections and having projections extending radially inward between the wheel rims of such wheel sections, and means projecting through said projections and the wheel rims of said wheel sections for fastening the same together, the outer surfaces of the wheel rims of said wheel sections being oppositely tapered and the inner surface of said tire-rim being doubly tapered to correspond to such outer surfaces.

21. In a wheel structure, the combination of an inner hub, two complete wheel sections removably mounted thereon in axial alinement, a tire-rim mounted on said wheel sections and having projections extending radially inward between such wheel sections, and means projecting through said projections and said wheel sections for fastening the same together, the outer surfaces of said wheel sections being oppositely tapered and the inner surface of said tire-rim being doubly tapered to correspond to such outer surfaces.

22. In a wheel structure, the combination of an inner tubular hub, two outer hubs mounted in axial alinement on said inner hub, each of said outer hubs comprising two tubular members telescoping each other and each of such members being provided with an outwardly extending flange, the two intermediate outer hub members being interchangeable and mounted on the outside of the end outer hub members.

23. In a wheel structure, the combination of an inner tubular hub, and two outer hubs mounted in axial alinement on said inner hub, each of said outer hubs comprising two tubular members telescoping on each other.

24. In a wheel structure, the combination of an inner tubular hub, and two outer hubs mounted in axial alinement on said inner hub, each of said outer hubs comprising two tubular members telescoping on each other, and each of said members being provided with an outwardly extending flange.

25. In a wheel structure, the combination of an inner tubular hub having an outwardly projecting flange at one end, and notched at the other end, two outer hubs mounted in axial alinement on said inner hub, each of said outer hubs comprising two tubular members telescoping on each other, the two intermediate outer hub members being mounted on the outside of the end outer hub members, one of the end outer hub members abutting against said flange and the other having inwardly projecting teeth extending into said notches.

26. In a wheel structure, the combination of an inner tubular hub having an outwardly projecting flange at one end, and notched at the other end, two outer hubs mounted in axial alinement on said inner hub, each of said outer hubs comprising two tubular members telescoping on each other, the two intermediate outer hub members being mounted on the outside of the end outer hub members, one of the end outer hub members abutting against said flange and the other having inwardly projecting teeth extending into said notches, and common holding means on the inner tubular hub for holding the outer hub members in position thereon.

In witness whereof, I have hereto set my hand at Indianapolis, Indiana, this fourth day of November, A. D. one thousand nine hundred and sixteen.

THOMAS J. LINDSAY.